United States Patent Office 3,055,053
Patented Sept. 25, 1962

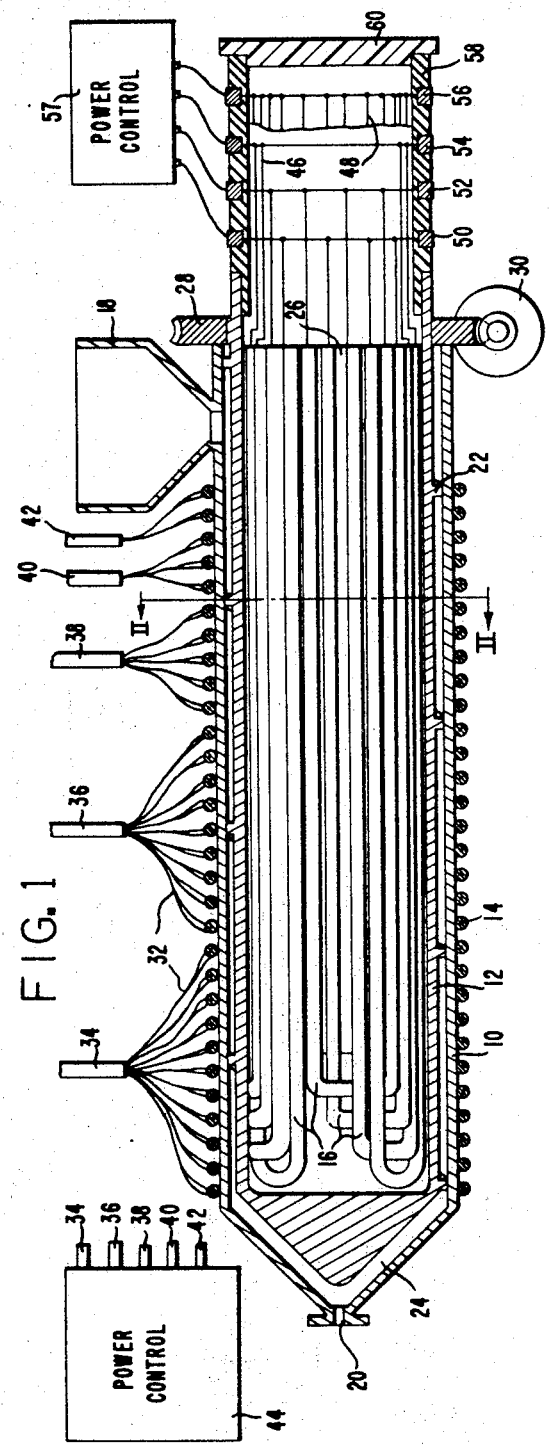
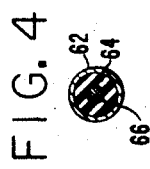
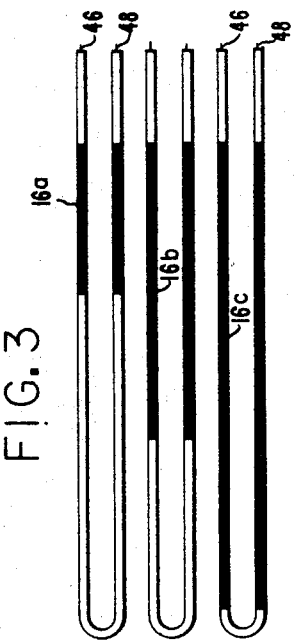
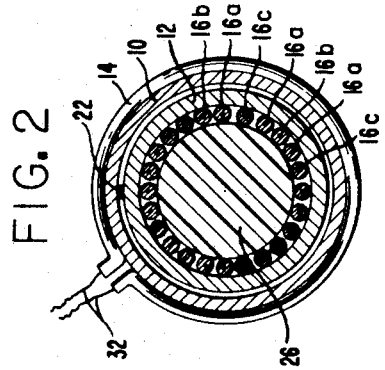

3,055,053
TEMPERATURE GRADIENT SCREW MELTER
Richard D. Livingston, Seaford, Del., and Robert C. Treadwell, Jr., Sudbury, Mass., assignors to E. I. du Pont de Nemours and Company, Wilmington, Del., a corporation of Delaware
Filed Nov. 12, 1959, Ser. No. 852,466
8 Claims. (Cl. 18—12)

This invention relates generally to the melt extrusion of particulate solid thermoplastic material and, more particularly, to improvements in the heating elements employed in the melt extrusion apparatus.

It is well known that, in the preparation of shaped and molded articles from synthetic linear condensation polymers according to the batchwise procedures disclosed by Carothers in U.S. Patents No. 2,071,250, 2,071,251 and 2,071,253, it is necessary to heat the polymer flake beyond its melting point and to forward the molten polymer under pressure. These functions are usually accomplished simultaneously in a screw extrusion apparatus having means therein for heating the various parts which the polymer contacts. Where there is a poor heat distribution along the length of the screw or where the screw is heated uniformly through its length, various temperature and pressure irregularities are encountered. High polymer temperatures lead to degradation whereas low temperatures lead to the formation of gel. These conditions can result in plugging of the extrusion piping or in viscosity changes which cause pressure surges in the subsequent stages of the process.

The most important object of the present invention is to achieve an ideal temperature gradient in the thermoplastic material passing through a screw extruder.

An equally important objective is the provision of a non-linear heat supply in a screw extruder by means of which material passing along the screw is heated to the desired point and thereafter extruded without any appreciable variation in temperature.

These and other objectives are accomplished in a melt extruder which includes a tubular housing having inlet and outlet passages, a hollow screw mounted for rotation in the housing and heater means within the screw as well as surrounding the housing. Both the exterior and the interior heater means are divided into zones or steps of different heat potential for the purpose of achieving an ideal temperature gradient in the thermoplastic material passing through the extruder.

Other objectives will become apparent in the following specification wherein reference is made to the accompanying drawings in which:

FIGURE 1 is a longitudinal sectional view through a melt extruder made in accordance with the teachings of the present invention;

FIG. 2 is a transverse sectional view taken on line II—II of FIG. 1, looking in the direction of the arrows;

FIGS. 3 illustrates the hairpin configuration of the interior heating elements shown in FIG. 1, with the shaded areas representing the various effective lengths employed in the illustrated embodiment;

FIG. 4 is a cross sectional view through one of the heating elements; and

Figure 5:
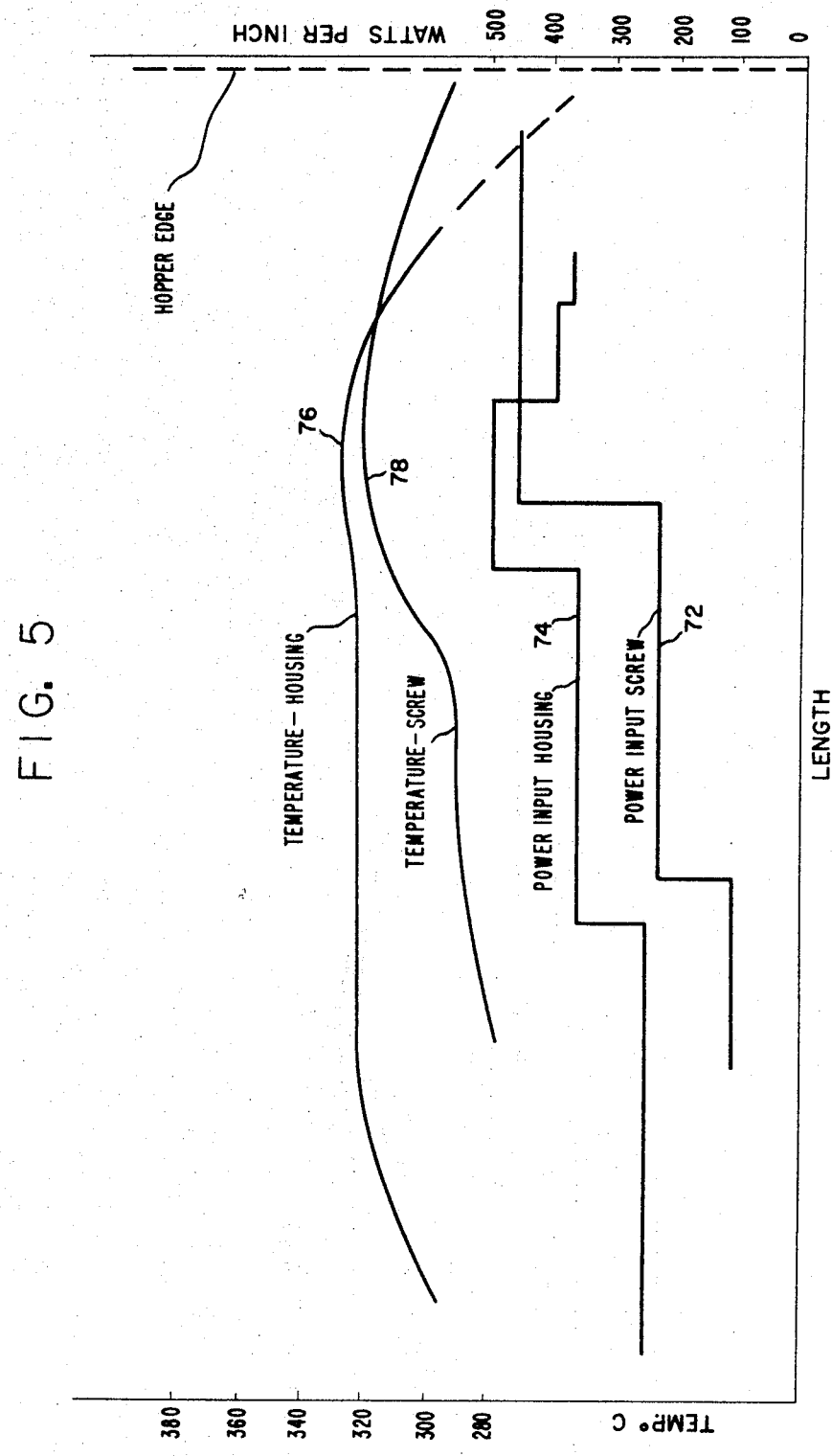
FIG. 5 is a diagram showing representative heat inputs to the screw and housing of FIG. 1 along with corresponding temperature profiles of the same elements.

As shown in FIGS. 1 and 2, the apparatus embodiment chosen for illustration includes, as components thereof, a hollow cylindrical housing 10, an extrusion screw 12, a plurality of individual housing heaters 14, and a plurality of screw heater elements 16. Housing 10 has an inlet passage in the form of a hopper 18, is open at the inlet end, and tapers to an outlet passage in the form of an extrusion hole 20 at its opposite end. The stock screw 12 has a helical land 22 and is of the same general configuration as housing 10 in that it has a bore, is open at one end, and is tapered at the opposite end to present a passage 24 leading to extrusion hole 20. The heater elements 16 are held in heat exchange relationship with screw 12 by a cylindrical plug 26. Screw 12 has attached thereto a gear 28 which is driven by a worm 30.

The heaters 14 are bent from an initially straight to a circular configuration (FIG. 2) and spaced at equal intervals along the length of and in surrounding relationship to the tubular housing 10. Each of these identical rod type heaters has a pair of leads 32 which pass through one of the conduits 34, 36, 38, 40, 42 to a power control device 44. The heaters have thus been divided into five different groups so that there are in effect five different zones in the length of housing 10. As is apparent in FIG. 1, these zones vary in length. As will be explained more fully hereinafter, the heating potential of each zone depends on the settings made at control device 44.

The elements 16 are bent from an initially straight to a U-shaped or hairpin configuration and arranged within the hollow screw 12 in groups of four. To facilitate the nesting arrangement which has been illustrated in FIG. 1, each element 16 in a group is formed differently at the bight and varies slightly in length from the next adjacent element. If straight elements were to be used, it would be necessary to run wires through the length of the screw in order to complete the circuits through the elements. The hairpin design of the elements 16 leads to a substantial lessening of the incidence of short circuits in that all connections may be made at the open end of the screw. The elements 16 have wires 46, 48 extending from the ends thereof. In each instance, the wire 46 is connected to one of the slip rings 50, 52, 54 whereas all of the wires 48 are connected to a common slip ring 56 to adapt the elements to a three phase power control device 57. Manifestly, different connections could be made depending on the available source of power. The slip rings 50—56 are embedded in a commutator drum 58, of non-conducting material, which is mounted in the open end of screw 12 in any suitable manner. Drum 58 is closed by a suitable cap 60.

In FIG. 3, the hairpin configuration of the elements 16 has been illustrated, with the shaded areas representing different effective lengths. The effective length depends on the length of a resistance wire which is embedded in each leg of the elements 16. In FIGS. 2 and 3, the suffixes $a$, $b$ and $c$ indicate the various effective lengths employed in the illustrated embodiment. With the elements 16 arranged in the order indicated in FIG. 2, it is apparent that there are three successive heating steps in the length of screw 12 and that the amount of heat derived from the energized elements 16 diminishes from step to step as the material travels through the apparatus. FIG. 4 is a direct cross sectional view through one of the external heaters 14 or through one of the elements 16 in its shaded area (FIG. 3). Each of the heaters and elements includes an outer metal sheath 62 which is filled with a ceramic material 64 having a Nichrome resistance wire 66 embedded therein. The separate resistance wires in the legs of each element 16 are connected by a suitable conductor.

In operation, a thermoplastic material such as polyhexylmethylene adipamide is introduced at hopper 18 and positively advanced through housing 10 by screw 12 which in turn is driven by a suitable prime mover connected to the worm 30. As shown by the graph 72 in FIG. 5, screw heat is applied at a point just downstream from hopper 18 which point is in advance of that at which heat is first applied by the heaters 14. The resultant temperature differential between screw 12 and housing 10 causes a high amount of shear in the polymer flake adjacent to the housing and a consequent forward motion is imparted to the already molten polymer surrounding the screw. Subsequently, as shown by the graph 74 in FIG. 5, external heat is applied to the housing so as to raise it rapidly (see curve 76, FIG. 5) to a temperature about 10% above the melting point of the polymer. In the illustrated embodiment, power is supplied to the elements 16 through the slip rings 50—56 and the power control device 57. The amount of power supplied to the heaters 14 depends on the settings made at control device 44, which settings are made so as to achieve the several different watt density steps shown in graph 74. For example, the watt density or heating potential is highest in the third zone because the wires 32 feeding that zone are energized with more power than the wires feeding the remaining zones. With the elements 16a, 16b, 16c arranged alternately, as best illustrated in FIG. 2, there is a uniform distribution of heat to each of the successive steps, as shown in graph 72. In this manner, an ideal temperature gradient is achieved in the polymer as it flows through the extrusion apparatus. The resulting temperature profiles of the housing and screw are shown respectively by the curves 76 and 78 in FIG. 5.

The apparatus disclosed herein is useful in the melt extrusion of synthetic linear condensation polymers to form various shaped objects such as filaments or films and various molded objects such as gears or coils. As a result of step-heating both the housing and the screw, the temperature spread of these elements through the length of the apparatus is reduced substantially. The greatest advantage lies in the fact that continuous operation over extended periods of time is facilitated without any appreciable variation in the temperature and pressure of the extruded material since both degradation and gel formation are reduced to a minimum by maintaining the polymer within about 10–40° C. above its melting point.

In the disclosed embodiment, heater elements 16 have been described as unitary in construction. It is also possible to join two straight sections with a preformed bight section by welding or the like. Similarly, the elements 16 have been shown with a three phase power connection to control device 57 which may, for example, be a timer. The latter could be replaced with a saturable reactor circuit using single phase power. It is apparent that these and other changes and modifications may be made in the disclosed extrusion apparatus without departing from the spirit of the present invention which is therefore intended to be limited only by the scope of the appended claims.

We claim:

1. A melt extruder comprising: a hollow, cylindrical housing having inlet and outlet passages adjacent the respective ends thereof; a screw mounted for rotation in and relative to the housing, said screw having a bore therein and being closed at the end adjacent said outlet passage; heater means surrounding the housing, said heater means being divided into zones of different heat potential along the length of the housing; and a plurality of elongated electrical screw-heating elements disposed longitudinally of the bore and mounted therein for rotation with the screw, said elements being substantially coextensive in length, each element having an effective length differeing from that of the elements next adjacent thereto and also having uniform electrical characteristics through its effective length whereby to provide a non-linear heat supply in at least two steps along the screw length and a uniform heat supply in each step.

2. A melt extruder comprising: a tubular housing having inlet and outlet passages adjacent the respective ends thereof; a hollow screw mounted for rotation in and relative to the housing, said screw being closed at the end adjacent said outlet passage; heater means surrounding the housing, said heater means being divided into zones of different heat potential along the length of the housing; and a plurality of separate and independent elongated electrical screw-heating elements disposed longitudinally in and fixedly mounted on said screw for rotation therewith, each element being in heat exchange relationship with the screw and having substantially straight resistance wires therein, the wires in adjacent elements being of different length whereby to provide a non-linear heat supply in successive steps along the length of the screw, each resistance wire having uniform electrical characteristics through its length whereby to provide a uniform heat supply in each step.

3. The melt extruder of claim 2 wherein each of said elements is U-shaped and has a pair of legs, there being a resistance wire in each leg, said wires being electrically interconnected to provide a continuous circuit in each element.

4. The melt extruder of claim 3 wherein said wires extend from a point between said inlet and outlet passages toward said outlet passage whereby to provide maximum screw heat in a first step adjacent said inlet passage and less screw heat in each succeeding step.

5. In a melt extruder: an elongated stock screw having a cylindrical bore; a plug extending substantially through the length of said bore; and a plurality of elongated electrical heating elements disposed longitudinally of the bore and fixedly positioned between the plug and said screw for rotation with the latter, said elements being substantially equal in length but having different effective lengths whereby to provide step heating through the length of the screw, each element having uniform electrical characteristics through its effective length whereby to provide a uniform heat supply in each step.

6. In a melt extruder: an elongated stock screw having a bore extending substantially through the length thereof; an elongated plug in said bore; and a plurality of U-shaped heating elements each having a pair of legs, said elements being in engagement with, held in place by and fixedly positioned between the plug and said screw with the legs disposed lengthwise of the screw, each leg having an electrical resistance wire therein, the wires in adjacent legs being of different length whereby to provide a non-linear heat supply in successive steps along the length of the screw, each resistance wire having uniform electrical characteristics through its length whereby to provide a uniform heat supply in each step.

7. In a melt extruder having a housing and a hollow stock screw rotatable in the housing, a step heater assembly comprising: a plurality of electrical heating elements mounted within said screw for rotation therewith, each element being in the shape of a hairpin having a pair of straight portions disposed longitudinally of the screw and an interconnecting bight, each straight portion having a resistance wire therein, said wires being of various lengths from element to element whereby to provide different amounts of heat in each of several steps along the length of the screw, each resistance wire having uniform electrical characteristics through its length whereby to provide a uniform heat supply in each step.

8. An apparatus for handling plastic material, said apparatus comprising: a first elongated hollow housing having an inlet for the material; a second elongated hollow housing disposed longitudinally within and spaced from said first housing, the latter having an outlet through which material exists after passing along said second housing; heater means for said first housing, said heater means comprising a plurality of elongated electrical units surrounding the first housing, said units being divided into zones of different heat potential, the units in each zone having uniform electrical characteristics and being spaced at equal intervals whereby to provide a uniform heat supply in each zone; and a plurality of U-shaped heating elements, each having a pair of legs and an interconnecting bight, said elements being mounted in the second housing for rotation therewith, said second housing being closed at the end adjacent said outlet, said legs each having an electrical resistance wire therein and being disposed longitudinally of and in contact with said second housing, the legs of each element having one leg of at least one other element nested therebetween, said bights being situated adjacent the closed end of said second housing and being bent into a configuration facilitating the nested arrangement of said legs, the wires in adjacent legs being of different length whereby to provide a non-linear heat supply in successive steps along the length of the screw, each resistance wire having uniform electrical characteristics through its length whereby to provide a uniform heat supply in each step.

References Cited in the file of this patent

UNITED STATES PATENTS

| | | |
|---|---|---|
| 1,496,356 | Noonan | June 3, 1924 |
| 1,677,651 | Noonan | July 17, 1928 |
| 2,303,340 | Dreyfus | Dec. 1, 1942 |
| 2,449,355 | Wiley et al. | Sept. 14, 1948 |
| 2,622,182 | Forzley et al. | Dec. 16, 1952 |
| 2,692,405 | Gayler | Oct. 26, 1954 |

OTHER REFERENCES

Sackett: "Speaking of Extrusion," SPE Journal, Aug. 1947, page 50.